United States Patent
Shinozaki et al.

(10) Patent No.: US 7,312,914 B2
(45) Date of Patent: Dec. 25, 2007

(54) ELECTROCHROMIC DISPLAY DEVICE AND ELECTRODEPOSITION-TYPE DISPLAY DEVICE

(75) Inventors: Kenji Shinozaki, Tokyo (JP); Akio Yasuda, Stuttgart (DE); Kazuhiro Noda, Kanagawa (JP); Toru Udaka, Kanagawa (JP); Mieko Kuwahara, Kanagawa (JP)

(73) Assignees: Sony Corporation, Tokyo (JP); Sony International (Europe) GmbH, Berlin (DE)

( * ) Notice: Subject to any disclaimer, the term of this patent is extended or adjusted under 35 U.S.C. 154(b) by 0 days.

(21) Appl. No.: 11/240,136

(22) Filed: Sep. 30, 2005

(65) Prior Publication Data

US 2006/0028707 A1    Feb. 9, 2006

Related U.S. Application Data

(62) Division of application No. 10/204,948, filed as application No. PCT/JP01/11535 on Dec. 27, 2001, now Pat. No. 6,992,808.

(30) Foreign Application Priority Data

Dec. 27, 2000  (JP)  ............................ P2000-398012
Dec. 7, 2001  (JP)  ............................ P2001-373610

(51) Int. Cl.
  *G02F 1/153*  (2006.01)
(52) U.S. Cl. .................... 359/270; 359/265; 345/49; 345/105; 348/817
(58) Field of Classification Search ............... 359/265, 359/270; 345/49, 105; 348/817
See application file for complete search history.

(56) References Cited

U.S. PATENT DOCUMENTS

| | | | |
|---|---|---|---|
| 4,571,029 A * | 2/1986 | Skotheim et al. | 359/266 |
| 4,573,768 A * | 3/1986 | Polak et al. | 359/270 |
| 5,581,394 A | 12/1996 | Green et al. | |
| 5,734,065 A * | 3/1998 | Saika | 549/59 |
| 6,166,847 A | 12/2000 | Tench et al. | |
| 6,400,491 B1 | 6/2002 | Tench et al. | |
| 6,661,563 B2 * | 12/2003 | Hayashi et al. | 359/296 |

FOREIGN PATENT DOCUMENTS

| | | |
|---|---|---|
| EP | 130249 | 1/1985 |
| JP | 54-061576 | 4/1979 |
| JP | 58-207027 | 12/1983 |
| JP | 63-291037 | 11/1988 |
| WO | WO 00/20528 | 4/2000 |

* cited by examiner

*Primary Examiner*—Hung X. Dang
*Assistant Examiner*—Joseph Martinez
(74) *Attorney, Agent, or Firm*—Sonnenschein Nath & Rosenthal LLP

(57) ABSTRACT

Between each transparent pixel electrode driven by TFT as a drive device and a common electrode, a polymer layer located in contact with the transparent pixel electrode and electrically active to change in color by electrochemical oxidization or reduction and a polymeric solid electrolytic layer located in contact with the polymer layer and containing a coloring agent are interposed. Since electrochemical oxidization or reduction brings about a color change, the contrast and the black concentration can be enhanced, and bronzing after long-time use does not occur.

10 Claims, 13 Drawing Sheets

ELECTROCHROMIC DISPLAY DEVICE AND ELECTRODEPOSITION-TYPE DISPLAY DEVICE

CROSS REFERENCE TO RELATED APPLICATION

The present application is a divisional of U.S. application Ser. No. 10/204.948, filed Mar. 6, 2003 now U.S. No. 6,922,808, which is a U.S. National Phase Application of PCT/JP01/11535, filed Dec. 27, 2001, which claims the benefit of and priority to Japanese Application No. P2000-398012, filed Dec. 27, 2000 and P2001-373610, filed Dec. 7, 2001.

TECHNICAL FIELD

This invention relates to an electrochromic display device and an electrodeposition-type display device using a material variable in color by electrochemical oxidation and reduction as the display material, and also relates to a display apparatus using them.

BACKGROUND ART

Along with recent dissemination of networks, documents having heretofore distributed in form of printed matters have come to be distributed in form of so-called electronic documents. Additionally, more and more books and magazines are also becoming delivered in form of so-called electronic publications.

Conventional way of accessing to these kinds of information is to read from CRT or liquid crystal displays of computers. However, it is pointed out that emission-type displays cause much fatigue due to ergonomic reasons, and users cannot withstand long-time reading. Additionally, there is the disadvantage that a user can read it only at the place where a computer is set.

Together with recent distribution of note-type computers, there are devices usable as portable displays. However, also these devices cannot be used for reading over several hours or more because of the problem of power consumption in addition to the reason that the display is of an emission type. Reflection-type liquid crystal displays have also been developed recently, and it will be possible to drive them with low power. However, reflectance of liquid crystal under no display (black-and-white display) is 30%, and visibility of such displays is much worse than prints on paper. Therefore, users are liable to fatigue and cannot withstand long-time reading.

To deal with these problems, devices called paper-like displays or electronic paper are under development. They color their representations mainly by moving color particles between electrodes by electrophoresis or by rotating dichromatic particles in an electric field. These methods, however, involve the problems that gaps among particles absorb light and thereby degrade the contrast, and a writing speed acceptable for practical use (within one second) cannot be attained unless raising the drive voltage to 100 V or more.

Electrochromic display apparatuses (ECD) generating color by electrochemical operations are superior to the electrophoretic schemes from the viewpoint of high contrast, and have already been used in practical light control glass and watch or clock displays. However, since light control glass and clock or watch displays do not originally need the matrix drive, they are not applicable to the use of display such as electronic paper. Additionally, quality level of black is bad, in general, and their reflectance is still low.

Displays such as electronic paper are inevitably exposed continuously to light such as sunlight or room light because of their purposes of use. In electrochromic display apparatuses of the type practically used as light control glass and clock displays, certain organic materials are used for forming black portions. Generally, however, organic materials exhibits poor light resistance, and are bronzed and degraded in black optical density after long use. Additionally, a matrix-driven display apparatus taught by Japanese Patent Publication No. hei 4-73764 is also known. However, the drive device merely composes a part of the liquid crystal display apparatus.

In view of these technical problems, it is an object of the invention to provide an electrochromic display device and an electrochromic display apparatus operative by matrix driving and capable of enhancing the contrast and the black optical density.

A further object of the invention is to provide an electrochromic display device and an electrochromic display apparatus capable of maintaining the black optical density high without the problem of bronzing even after long-time use.

DISCLOSURE OF INVENTION

To overcome the above-discussed problems, an electrochromic display device according to the invention comprises: a first transparent electrode controlled by a drive device: a polymer material layer located in contact with the transparent electrode and electrically active to be changeable in color by electrochemical oxidation or reduction; a polymeric solid electrolytic layer located in contact with the polymer material layer and containing a coloring agent; and a second electrode located to interpose the polymer material layer and the polymeric solid electrolytic layer between the first transparent electrode and the second electrode.

In the electrochromic display device having the above-summarized configuration, when electricity is supplied between the first transparent electrode and the second electrode, the polymeric material layer interposed between the first transparent electrode and the second electrode is electrically activated to change in color. Since the polymeric solid electrolytic layer adjacent to the polymeric material layer contains a coloring agent, the contrast upon a change in color in the polymeric material layer can be enhanced. Since the first transparent electrode is controlled by the drive device, matrix drive is possible when a plurality of drive devices are arranged.

An electrodeposition type display device according to the invention comprises: a first transparent electrode controlled by a drive device; a polymeric solid electrolytic layer containing a coloring agent and metal ions; and a second electrode located to interpose the polymeric solid electrolytic layer between the first transparent electrode and the second electrode.

In the electrodeposition type display device having the above-summarized configuration, when electricity is supplied between the first transparent electrode and the second electrode, electrochemical deposition by gold ions contained in the polymeric solid electrolytic layer occurs in the polymeric solid electrolytic layer, and a change in color occurs. Since the polymeric solid electrolytic layer contains a coloring agent, the contrast upon a change in color in the polymeric material layer can be enhanced, and matrix drive is possible by using the drive device.

When a plurality of electrochromic display elements each having the structure of the electrochromic display device according to the invention or a plurality of electrodeposition type display elements each having the structure of electrodeposition type display device according to the invention are arranged in form of a sheet, an electrochromic display apparatus or electrodeposition type display apparatus is formed.

A method of manufacturing an electrochromic display apparatus or an electrodeposition type display apparatus according to the invention comprises: the step of forming transparent pixel electrodes and drive devices on a transparent support structure; the step of forming a polymer material layer electrically active and changeable in color by electrochemical oxidization or reduction, and a polymeric solid electrolytic layer containing a coloring agent on the transparent support structure having formed the transparent pixel electrodes and the drive devices, or the step of forming a polymeric solid electrolytic layer containing metal ions and a coloring agent; and the step of forming a common electrode opposed to the transparent pixel electrodes.

Following to the above-summarized manufacturing method, it is possible to manufacture the electrochromic display apparatus or electrodeposition type display apparatus including a plurality of electrodeposition type display elements each having the structure of electrodeposition type display device or a plurality of electrodeposition type display elements each having the structure of electrodeposition type display device that are arranged in form of a sheet.

BRIEF DESCRIPTION OF DRAWINGS

FIGS. 5A, 5B and 5C are cross-sectional views showing respective steps of a manufacturing method of an electrochromic display apparatus according to the third embodiment of the invention, in which FIG. 5A is a cross-sectional view after progress up to the step of forming TFT and transparent pixel electrodes, FIG. 5B is a cross-sectional view after progress up to the step of immersion into an electrodeposition vessel, and FIG. 5C is a cross-sectional view after progress up to the step of forming a polymeric solid electrolytic layer;

FIGS. 6A, 6B and 6C are cross-sectional views showing respective steps continuous from the steps of FIGS. 5A, 5B and 5C of the manufacturing method of an electrochromic display apparatus according to the third embodiment of the invention, in which FIG. 6A is a cross-sectional view after progress up to the step of press-fitting a support structure, FIG. 6B is a cross-sectional view after progress up to the step of bonding, and FIG. 6C is a cross-sectional view after progress up to the step of attaching a sealing material;

FIGS. 7A, 7B and 7C are cross-sectional views showing respective steps of a manufacturing method of an electrochromic display apparatus according to the fourth embodiment of the invention, in which FIG. 7A is a cross-sectional view after progress up to the step of forming TFT and transparent pixel electrodes, FIG. 7B is a cross-sectional view after progress up to the step of forming a polymeric solid electrolytic layer, and FIG. 7C is a cross-sectional view after progress up to the step of immersion into an electrodeposition vessel;

FIGS. 8A, 8B and 8C are cross-sectional views showing respective steps of a manufacturing method of an electrodeposition type display apparatus according to the fifth embodiment of the invention, in which FIG. 8A is a cross-sectional view after progress up to the step of forming TFT and transparent pixel electrodes, FIG. 8B is a cross-sectional view after progress up to the step of forming a polymeric solid electrolytic layer, and FIG. 8C is a cross-sectional view after progress up to the step of press-fitting a support structure;

FIGS. 9A and 9B are cross-sectional views showing respective steps continuous from the steps of FIGS. 8A, 8B and 8C of the manufacturing method of an electrodeposition type display apparatus according to the fifth embodiment of the invention, in which FIG. 9A is a cross-sectional view after progress up to the bonding step, and FIG. 9B is a cross-sectional view after progress up to the step of attaching a sealing material;

BEST MODE FOR CARRYING OUT THE INVENTION

Electrochromic display apparatuses according to some embodiments of the invention will now be explained below with reference to the drawings. Any of the electrochromic display apparatuses according to the embodiments has a structure in which a plurality of electrochromic display elements each having the structure of an electrochromic display device are arranged in form of a sheet.

First Embodiment

Figure 1:
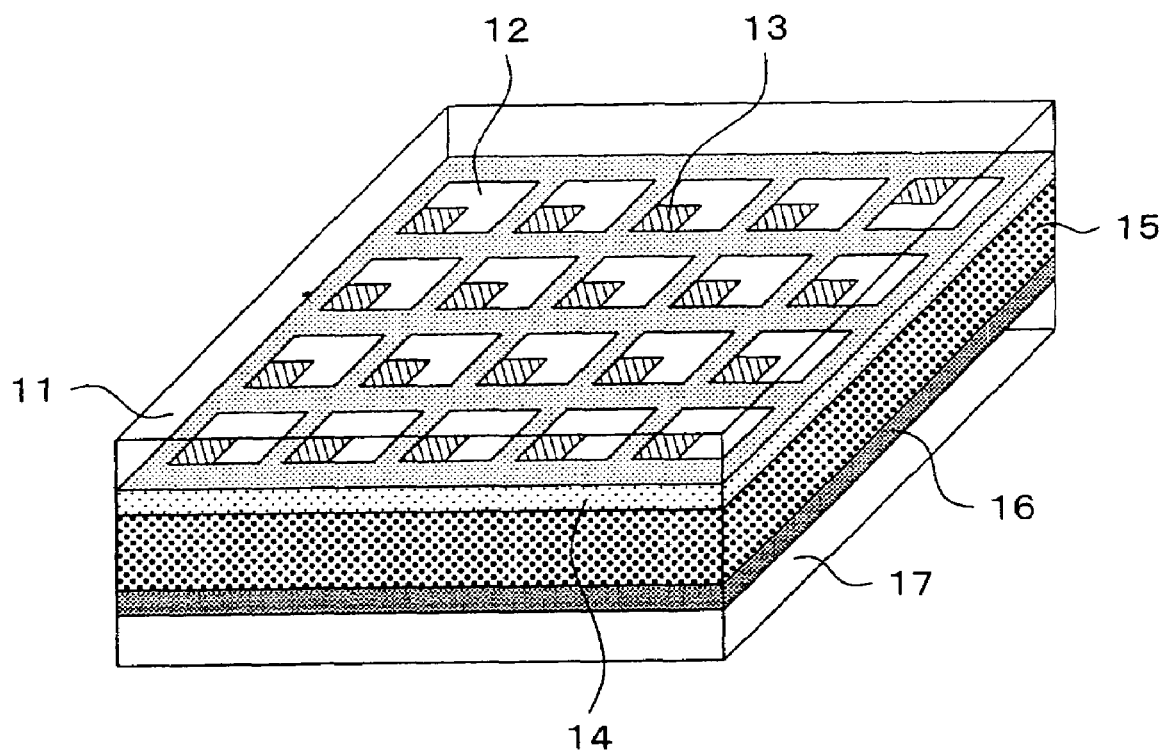
FIG. 1 shows fragmentary, perspective views of an electrochromic display apparatus according to the first embodiment of the invention.
Figure 2:
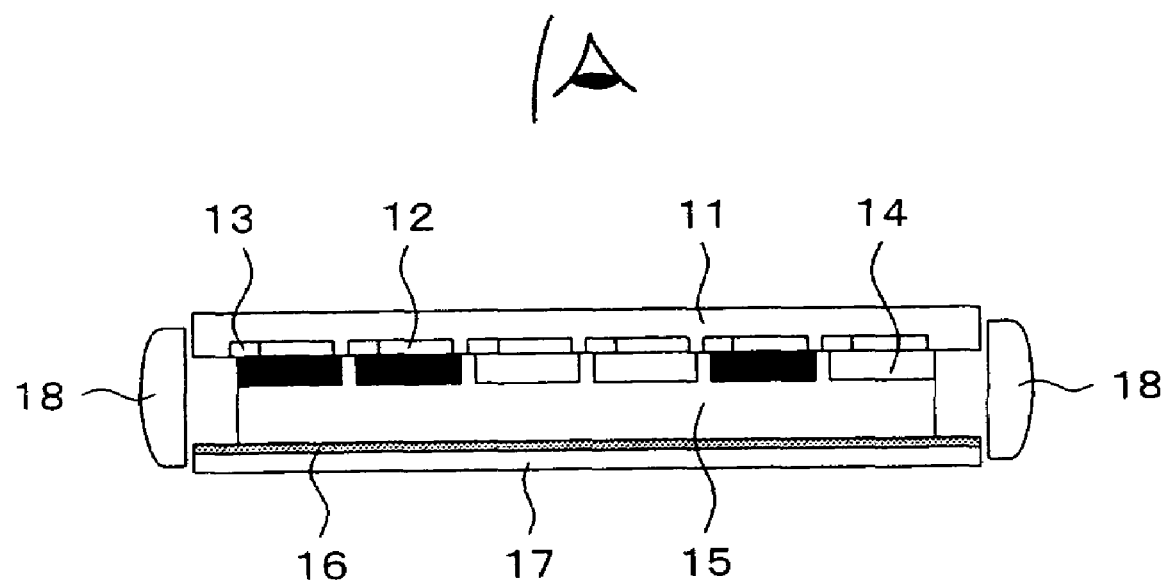
FIG. 2 is a cross-sectional view of the electrochromic display apparatus according to the first embodiment of the invention.

As shown in FIGS. 1 and 2, the electrochromic display apparatus according to this embodiment is characterized in arranging a plurality of electrochromic display devices in form of a sheet, each electrochromic display device including a transparent pixel electrode 12 serving as a first transparent electrode controlled by TFT (Thin Film Transistor) 13 as a drive device, a polymer layer 14 electrically active and variable in color due to electrochemical oxidation or reduction, a polymeric solid electrolytic layer 15 in contact with the polymer layer 14 and containing a coloring agent, and a common electrode 16 commonly used by this and other pixels to function as a second electrode opposed to the first transparent electrode.

Each combination of the transparent pixel electrode 12 and TFT 13 form one pixel, and a number of pixels are arranged in a matrix pattern on a transparent support structure 11. As the transparent support structure 11, a transparent glass substrate such as quartz glass plate or whiteboard glass plate, for example, may be used. In addition to these, other materials are also acceptable, namely, esters such as polyethylene naphthalate and polyethylene terephthalate; cellulose esters such as polyamide, polycarbonate and cellulose acetate; fluorine polymers such as polyvinylidene fluoride, polytetrafluoroethylene-cohexafluoropropylene; polyethers such as polyoxymethylene; polyolefins such as polyacetal, polystyrene, polyethylene, polypropylene and metylpentene polymer; and polyimide such as polyimide-amide and polyetherimide. In case of using any of these synthetic resins, it may be formed into a rigid substrate not bending easily, or may be formed into a flexible film-like structure.

The transparent pixel electrode 12 is made of a transparent conductive film formed in a substantially rectangular or square pattern, and as shown in FIG. 1, individual pixels are isolated. Locally therein, TFT 13 for each pixel is located. Here is preferably used an ITO film of a mixture of $In_2O_3$ and $SnO_2$, or a film coated by $SnO_2$ or $In_2O_3$. It is also acceptable to dope Sn or Sb into the ITO film or the $SnO_2$- or $In_2O_3$-coated film, and MgO or ZnO are also usable.

TFT 13 formed in each pixel is selected by a wiring not shown to control the associated transparent pixel electrode 12. TFT 13 is very efficient for preventing cross-talk among pixels. TFT 13 is formed to occupy a part of the transparent pixel electrode, for example. Alternatively, the transparent pixel electrode 12 may lie in a different level from TFT 13 in the stacking direction. A gate line and a data line are connected to TFT 13, its gate electrode is connected to each gate line, one of the source and the drain of TFT 13 is connected to a data line, and the other of the source and the drain is electrically connected to the transparent pixel electrode 12. A drive device other than TFT 13 may be made of a different material if it can be formed on a transparent substrate in a matrix drive circuit used in a flat type display.

The transparent pixel electrode 12 and TFT 13 are in contact with a polymer layer 14 that is a polymeric material layer. The polymer layer 14 is made of a polymeric, electrochromic material that is electrically active. The polymer layer 14 is changed in color by electrochemical oxidation or reduction, and when a potential difference is applied to the transparent pixel electrode 12 as one of opposite electrodes of the capacitance, it changes to black. The polymer layer 14 is preferably made of a so-called conductive polymer obtained by electrolytic synthesis. This is because the conductivity facilitates quick electron exchange interaction and ensures quick reaction of coloring and decoloring. Examples of preferable polymers are shown in Table 1. Other polymer materials obtained by electrolytic oxidizing polymerization of derivatives of pyrole, thiophene, azulene and aniline are also usable. It is also possible to use materials combining such materials with the polymers shown in Table 1 and their derivatives.

TABLE 1

| Polymer | Oxidation potential (vs. $Li^+/Li$) | Reduction potential (vs. $Li^+/Li$) | Coulomb efficiency |
| --- | --- | --- | --- |
| Polypyrole | 2.85 | 2.6 | 99% or more |
| Polyaniline | 4.2 | 4.0 | 99% or more |
| Polyazulene | 3.6 | 3.2 | 99% or more |

TABLE 1-continued

| Polymer | Oxidation potential (vs. $Li^+/Li$) | Reduction potential (vs. $Li^+/Li$) | Coulomb efficiency |
| --- | --- | --- | --- |
| Polythiophene | 4.5 | 3.6 | 96% |
| Polyindole | 3.8 | 3.5 | 95% |
| Polycarbazole | 3.7 | 3.6 | 81% |

One of especially preferable materials among polymer materials shown in the table (polypyrole, polyaniline, polyazulene, polythiophene, polyindole and polycarbazole) is polypyrole. Its reasons are 1) low oxidation potential, 2) high coulomb efficiency, 3) black coloring upon oxidation and 4) long repetition lifetime, among others. The reason why materials of low oxidation potentials are preferred lies in that those materials lower in oxidation potential are stable in a colored state. The reason why materials having high coulomb efficiency are considered desirable lies in that the high coulomb efficiency demonstrates suppression of side reaction as much. When the coulomb efficiency is nearly 100%, it demonstrates that almost no side reaction occurs and results in lower lifetime as a device. It is an important nature as a document display that the coloring upon oxidation is black. Polypyrole is black upon complete oxidation while the other materials are green or reddish black. Therefore, by employing polypyrole, it is possible to enhance the black concentration and improve the contrast. Additionally, the long repetition lifetime is another useful nature of polypyrole.

A polymeric solid electrolytic layer 15 is formed in contact with the coloring polymer 14. If the polymeric solid electrolyte forming the polymeric solid electrolytic layer 15 and the polymer material as the electrochromic material are compounded, it is advantageous to alleviate falling or powdering of the polymer material from the electrode due to volume changes caused by coloring and decoloring and thereby increase the durability.

As the matrix polymer used in the polymeric solid electrolyte forming the polymeric solid electrolytic layer 15, examples of usable materials are polyethylene oxide, polypropylene oxide, polyethylene imine and polystyrene sulfide whose framework structure units are expressed by —(C—C—O)$_n$—, —(C—C(CH$_3$)—O)$_n$—, —(C—C—N)$_n$— or —(C—C—S)$_n$—. Branches may be added to any of these materials forming the main chain structure. Polymethylmethacrylate, polyvinylidene fluoride, polyvinylidene chloride and polycarbonate are also preferable.

When the polymeric solid electrolytic layer 15 is formed, a quantity of plasticizer is preferably added to the matrix polymer. Examples of preferable plasticizers are water, ethyl alcohol, isopropyl alcohol and their mixture, for example when the matrix polymer is hydrophilic. If the matrix polymer is hydrophobic, propylene carbonate, dimethyl carbonate, ethylene carbonate, γ-butylolactone, acetonitrile, sulfolane, dimethoxyethane, ethyl alcohol, isopropyl alcohol, dimethylformamide, dimethylsulfoxide, dimethylacetamide, n-methylpyrolidone and their mixtures.

The polymeric solid electrolyte is formed by melting an electrolytic substance into the matrix polymer, examples of usable materials as the electrolyte are lithium salt such as LiCl, LiBr, LiI, LiBF$_4$, LiClO$_4$, LiPF$_6$ or LiCF$_3$SO$_3$, potassium salt such as KCl, KI or KBr, sodium salt such as NaCl, NaI, NaBr or tetra alkyl ammonium salt such as tetra ethylene ammonium, boron tetra ethylene ammonium fluoride, tetra ethylene ammonium perchlorate, boron tetrabuthylene ammonium fluoride, tetrabuthyl ammonium perchlorate or tetrabuthyl ammonium halide. Alkyl chains of the above-mentioned 4-ammonium salt may be irregular.

If the polymeric solid electrolyte and the polymer material as the electrochromic material are compounded, it is advantageous to alleviate falling or powdering of the polymer material from the electrode due to volume changes caused by coloring and decoloring and thereby increase the durability. The polymeric solid electrolyte is obtained by first forming the polymeric solid electrolytic material on the first electrode beforehand by an appropriate method, and thereafter carrying out electrolytic oxidizing polymerization in an electrodeposition vessel containing pyrole monomer.

The polymeric solid electrolytic layer 15 contains a coloring agent for enhancing the contrast. In case the coloring of the polymer layer 14 is black as mentioned above, a white material having a high concealing property is used as the background color. As this kind of material, white coloring particles may be used, such as those of titanium dioxide, calcium carbonate, silica, magnesium oxide, or aluminum oxide.

Mixture ratio of the coloring agent is preferably in the range of approximately 1 through 20 wt %, more preferably in the range of approximately 1 through 10 wt % and still more preferably in the range of approximately 5 to 10 wt % when inorganic particles are used. Inorganic white particles of titanium oxide, for example, do not solve into polymers but merely disperse. Then, if the mixture ratio increases, inorganic particles aggregate, and it results in uneven optical density. Additionally, since those inorganic particles have no ion conductivity, an increase of the mixture ratio invites a decrease of the conductivity of the polymeric solid electrolyte. Taking both into consideration, the upper limit of the mixture ratio is approximately 20 wt %.

In case that inorganic particles are mixed as the coloring agent, thickness of the polymeric solid electrolytic layer 15 is adjusted preferably in the range of 20 to 200 μm, more preferably in the range of 50 to 150 μm and still more preferably in the range of 70 to 150 μm. The polymeric solid electrolytic layer 15 had better be thin because the resistance between electrodes decreases, and it contributes to a decrease of the coloring/decoloring time and power consumption. However, thinning the layer to 20 μm or less is not recommended because the mechanical strength decreases to a level causing pin holes and cracking. In addition, if the layer is excessively thin, quantity of white particles mixed inevitably decreases, and the white level (optical density) is not sufficient.

The mixture ratio of the coloring agent may be 10 wt % when a pigment is used because coloring efficiency of a pigment is much higher than that of inorganic particles. Therefore, any electrochemically stable pigment can make a contrast even when its quantity is small. Usually, an oil-soluble dye is preferable as the pigment.

On one side opposed to the first transparent electrode, a common electrode 16 is formed as the second electrode. The common electrode may be made of any electrochemically stable material. Preferable materials are platinum, chromium, aluminum, cobalt, palladium, and so on. The common electrode can be made by forming a film of a conductor such as a metal film on a support structure 17. If a metal used for main reaction can be supplied beforehand or any time thereafter, carbon can be used as the common electrode. To support carbon on the electrode, there is the method of preparing carbon ink by using a resin, and then print it on the substrate surface. The use of carbon contributes to lowering the cost of the electrode.

The support structure 17 need not be transparent. It can be used a substrate or film which can reliably hold the common electrode 16 and the polymeric solid electrolytic layer 15. Some examples are glass plates such as quartz glass plate and whiteboard glass plates, ceramic substrates, paper substrates and wood substrates. In addition to these, other materials are also usable as synthetic resin substrates, namely, esters such as polyethylene naphthalate and polyethylene terephthalate; cellulose esters such as polyamide, polycarbonate and cellulose acetate; fluorine polymers such as polyvinylidene fluoride, polytetrafluoroethylene-co-hexafluoropropylene; polyethers such as polyoxymethylene; polyolefins such as polyacetal, polystyrene, polyethylene, polypropylene and metylpentene polymer; and polyimide such as polyimide-amide and polyetherimide. In case of using any of these synthetic resins, it may be formed into a rigid substrate not bending easily, or may be formed into a flexible film-like structure. If the common electrode 16 is sufficiently rigid, the support structure 17 may be omitted.

As shown in FIG. 2, for the purpose of placing the first transparent electrode and the second electrode face-to-face, a sealing resin portion 18 is formed along the perimeter to hold both support structures 11, 17. The sealing resin portion 18 will reliably hold these support structures 11, 17, and other intervening components, namely, transparent pixel electrode 12, TFT 13, polymer layer 14, polymeric solid electrolytic layer 15 and common electrode 16.

Using the above-explained structure, the electrochromic display apparatus according to the embodiment is capable of matrix driving by using TFT 13, and can enhance the contrast and the black optical density by selecting an appropriate material of the polymer layer 14.

Second Embodiment

Figure 3:
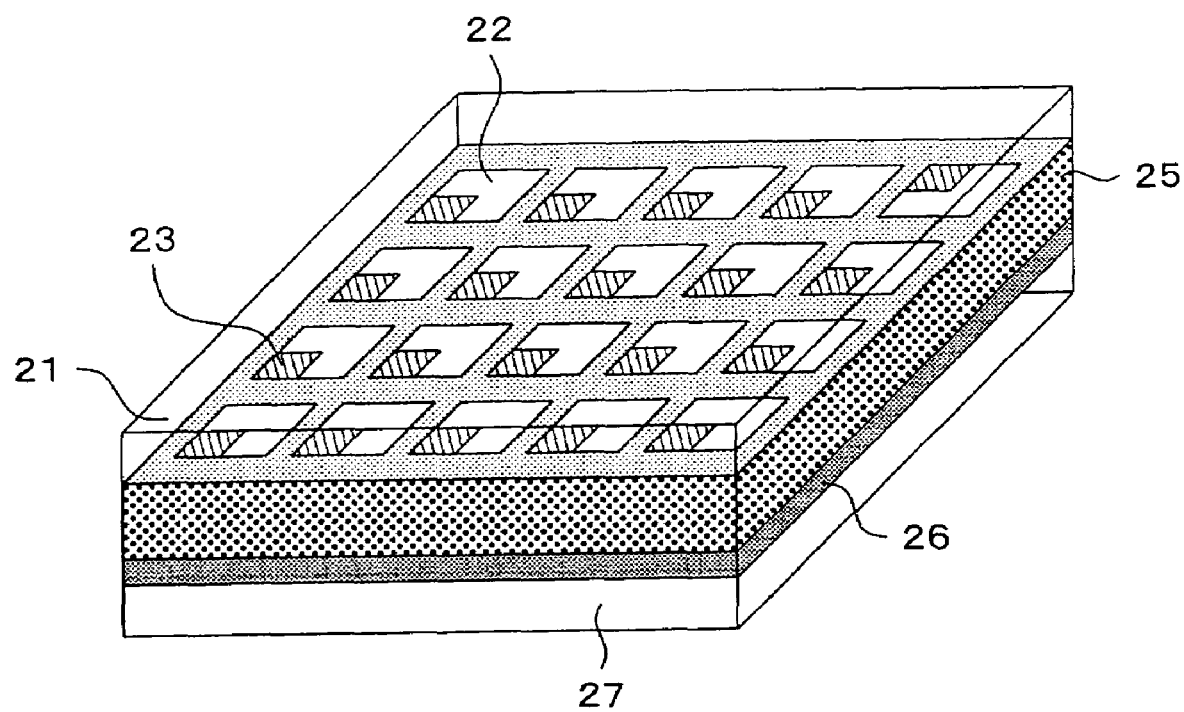
FIG. 3 shows fragmentary, perspective views of an electrodeposition type display apparatus according to the second embodiment of the invention.
Figure 4:
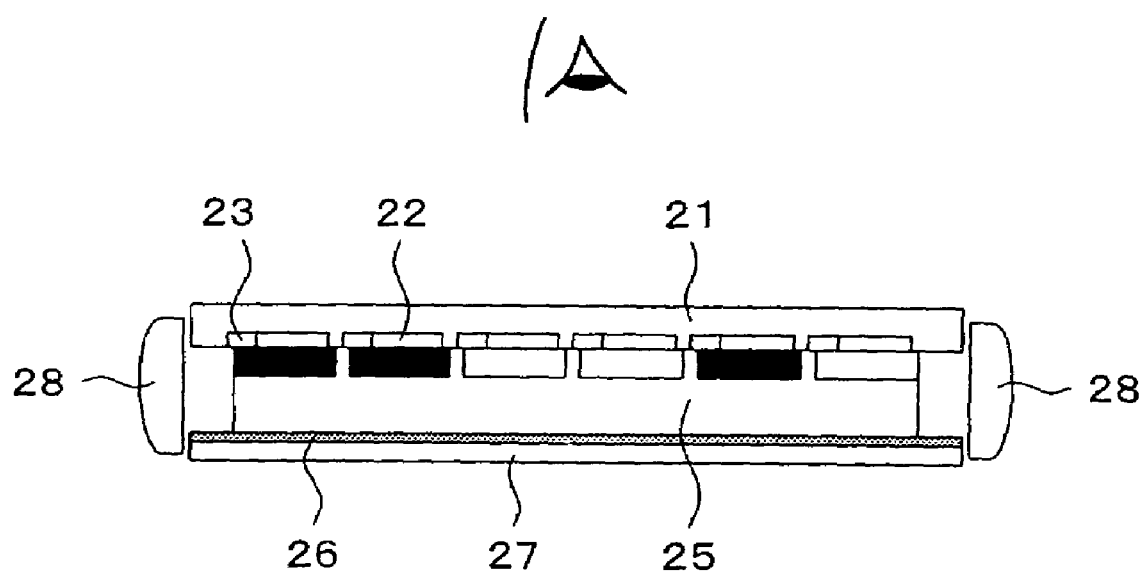
FIG. 4 shows cross-sectional views of the electrodeposition type display apparatus according to the second embodiment of the invention.

As shown in FIGS. 3 and 4, an electrodeposition type display apparatus according to this embodiment is characterized in arranging a plurality of electrodeposition type display devices in form of a sheet, which each electrodeposition type display device includes a transparent pixel electrode 22 serving as the first transparent electrode controlled by TFT (Thin Film Transistor) 23 as a drive device; a polymeric solid electrolytic layer 25 containing metal ions and a coloring agent, and a common electrode 26 commonly used by this and other pixels to function as the second electrode opposed to the first transparent electrode.

In the electrodeposition type display apparatus according to the embodiment, each combination of the transparent pixel electrode 22 and TFT 23 form one pixel, and a number of pixels are arranged in a matrix pattern on a transparent support structure 21. As the transparent support structure 11, a transparent glass substrate such as quartz glass plate or whiteboard glass plate, for example, may be used similarly to the first embodiment. In addition to these, other materials are also acceptable, namely, esters such as polyethylene naphthalate and polyethylene terephthalate; cellulose esters such as polyamide, polycarbonate and cellulose acetate; fluorine polymers such as polyvinylidene fluoride, polytetrafluoroethylene-cohexafluoropropylene; polyethers such as polyoxymethylene; polyolefins such as polyacetal, polystyrene, polyethylene, polypropylene and metylpentene polymer; and polyimide such as polyimide-amide and polyetherimide. In case of using any of these synthetic resins, it may be formed into a rigid substrate not bending easily, or may be formed into a flexible film-like structure.

The transparent pixel electrode 22 is made of a transparent conductive film formed in a substantially rectangular or square pattern, and as shown in FIG. 3, individual pixels are isolated. Locally therein, TFT 23 for each pixel is located. Here is preferably used an ITO film of a mixture of $In_2O_3$ and $SnO_2$, or a film coated by $SnO_2$ or $In_2O_3$ It is also acceptable to dope Sn or Sb into the ITO film or the $SnO_2$- or $In_2O_3$-coated film, and MgO or ZnO are also usable.

TFT 23 formed in each pixel is selected by a wiring not shown to control the associated transparent pixel electrode 22. TFT 23 is very efficient for preventing cross-talk among pixels. TFT 23 is formed to occupy a part of the transparent pixel electrode, for example. Alternatively, the transparent pixel electrode 22 may lie in a different level from TFT 23 in the stacking direction. A gate line and a data line are connected to TFT 23, its gate electrode is connected to each gate line, one of the source and the drain of TFT 13 is connected to a data line, and the other of the source and the drain is electrically connected to the transparent pixel electrode 22. A drive device other than TFT 23 may be made of a different material if it can be formed on a transparent substrate in a matrix drive circuit used in a flat type display.

In the electrodeposition type display apparatus according to the instant embodiment, the polymeric solid electrolytic layer 25 contains metal ions used for changing the color. The metal ions used for color change electrochemically deposit as so-called electrolytic plating, and reciprocally elute as the opposite reaction to effectuate display. Metal ions capable of coloring and decoloring by electrochemical deposition and elution are not limited to specific kinds of metals. However, some examples of such metal ions are bismuth, copper, silver, lithium, iron, chromium, nickel and cadmium ions and their combinations. Especially preferable metal ions are bismuth and silver ions because reciprocal reaction can be easily brought about and the color changing degree upon deposition is high.

As the matrix polymer used in the polymeric solid electrolyte forming the polymeric solid electrolytic layer 25 containing metal ions, examples of usable materials are polyethylene oxide, polypropylene oxide, polyethylene imine and polystyrene sulfide whose framework structure units are expressed by $-(C-C-O)_n-$, $-(C-C(CH_3)-O)_n-$, $-(C-C-N)_n-$ or $-(C-C-S)_n-$. Branches may be added to any of these materials forming the main chain structure. Polymethylmethacrylate, polyvinylidene fluoride, polyvinylidene chloride and polycarbonate are also preferable.

When the polymeric solid electrolytic layer 25 is formed, a quantity of plasticizer is preferably added to the matrix polymer. Examples of preferable plasticizers are water, ethyl alcohol, isopropyl alcohol and their mixture, for example when the matrix polymer is hydrophilic. If the matrix polymer is hydrophobic, propylene carbonate, dimethyl carbonate, ethylene carbonate, γ-butylolactone, acetonitrile, sulfolane, dimethoxyethane, ethyl alcohol, isopropyl alcohol, dimethylformamide, dimethylsulfoxide, dimethylacetamide, n-methylpyrolidone and their mixtures.

The polymeric solid electrolyte is formed by melting an electrolytic substance into the matrix polymer, examples of usable materials as the electrolyte are lithium salt such as LiCl, LiBr, LiI, $LiBF_4$, $LiClO_4$, $LiPF_6$ or $LiCF_3SO_3$, potassium salt such as KCl, KI or KBr, sodium salt such as NaCl, NaI, NaBr or tetra alkyl ammonium salt such as tetra ethylene ammonium, boron tetra ethylene ammonium fluoride, tetra ethylene ammonium perchlorate, boron tetrabuthylene ammonium fluoride, tetrabuthyl ammonium perchlorate or tetrabuthyl ammonium halide. Alkyl chains of the above-mentioned 4-ammonium salt may be irregular.

The polymeric solid electrolytic layer 25 contains a coloring agent for enhancing the contrast. In case the coloring of the metal ions is black as mentioned above, a white material having a high concealing property is used as the background color. As this kind of material, white coloring particles may be used, such as those of titanium dioxide, calcium carbonate, silica, magnesium oxide, or aluminum oxide. Further, a pigment for coloring can be used as well.

Mixture ratio of the coloring agent is preferably in the range of approximately 1 through 20 wt %, more preferably in the range of approximately 1 through 10 wt % and still more preferably in the range of approximately 5 to 10 wt % when inorganic particles are used. In case that inorganic particles are mixed as the coloring agent, thickness of the polymeric solid electrolytic layer 25 is adjusted preferably in the range of 20 to 200 μm, more preferably in the range of 50 to 150 μm and still more preferably in the range of 70 to 150 μm. Reasons of such conditions are the same as those in the explanation of the first embodiment. So explanation thereof is omitted here for avoiding redundancy.

The mixture ratio of the pigment-based coloring agent may be 10 wt % because coloring efficiency of a pigment is much higher than that of inorganic particles. Therefore, any electrochemically stable pigment can make a contrast even when its quantity is small. Usually, an oil-soluble dye is preferable as the pigment.

On one side opposed to the first transparent electrode, a common electrode 26 is formed as the second electrode. The common electrode may be made of any electrochemically stable material. Preferable materials are platinum, chromium, aluminum, cobalt, palladium, and so on. The common electrode can be made by forming a film of a conductor such as a metal film on a support structure 27. If a metal used for main reaction can be supplied beforehand or any time thereafter, carbon can be used as the common electrode. To support o carry carbon on the electrode, there is the method of preparing carbon ink by using a resin, and then print it on the substrate surface. The use of carbon contributes to lowering the cost of the electrode.

The support structure 27 need not be transparent. It can be used a substrate or film which can reliably hold the common electrode 26 and the polymeric solid electrolytic layer 25. Its candidate materials are the same as those of support structure according to the first embodiment. Additionally, as shown in FIG. 4, for the purpose of placing the first transparent electrode and the second electrode face-to-face, a sealing resin portion 28 is formed along the perimeter to hold both support structures 11, 17. The sealing resin portion 28 will reliably hold these support structures 21, 27, and other intervening components, namely, transparent pixel electrode 22, TFT 23, polymer layer 24, polymeric solid electrolytic layer 25 and common electrode 26.

Using the above-explained structure, the electrodeposition type display apparatus according to the embodiment is capable of matrix driving by using TFT 23, and can enhance the contrast and the black optical density by making use of metal ions contained in the polymeric solid electrolytic layer 25.

Third Embodiment

This embodiment is directed to a method of manufacturing the electrochromic display apparatus according to the first embodiment. The method will be explained below in the order of its steps with reference to FIGS. 5A through 5C and FIGS. 6A through 6C.

Figure 5A:
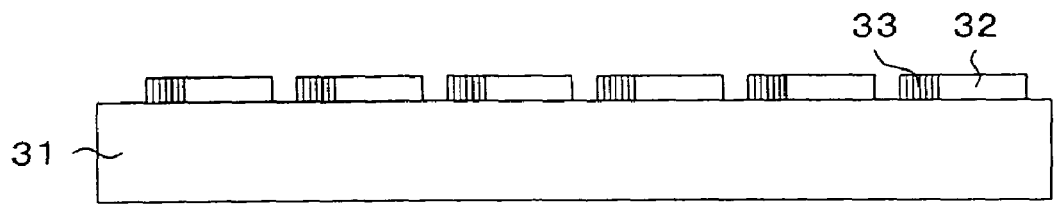
Figure 5B:
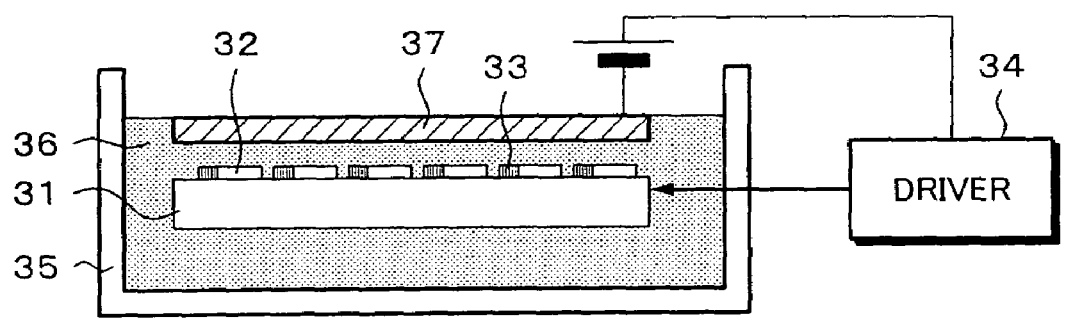

First referring to FIG. 5A, transparent pixel electrodes in form of an ITO film and thin-film transistors 33 are formed on a transparent support structure 31 such as a glass substrate for each pixel. The thin-film transistor 33 is formed by using a known semiconductor manufacturing technique, and the ITO film is formed by a technique such as vapor deposition or sputtering, for example. A transparent pixel electrode 32 and a thin-film transistor 33 are formed for each pixel, and a number of pixels are arranged in an matrix array on the transparent support structure 31.

After the transparent pixel electrodes 32 and the thin-film transistors 33 are formed on the transparent support structure 31, a lead portion connectable to a drive circuit 34 is formed. Then the entirety is immersed into electrodeposition liquid 36 in an electrodeposition vessel 35. The electrodeposition liquid 36 functions to electrolytically deposit a polymer layer of polypyrole, for example. The drive circuit 34 supplies electricity to each transparent pixel electrode 32 to electrolytically deposit the polymer layer, not shown, of polypyrole, for example, on each transparent pixel electrode 32. In this process, the transparent pixel electrodes 32 face to an electrodeposition electrode 37 via the electrodeposition liquid 36. Subsequently, the entirety is again immersed into the electrodeposition liquid in the electrodeposition vessel not containing a color-changing polymer material (in this case, pyrole) to once return the tops of the transparent pixel electrodes to transparency by deionizing the polymer layer. Thereafter, the transparent support structure 31 is removed from the electrodeposition liquid, washed with ethanol, and dried by vacuum drying.

Figure 5C:
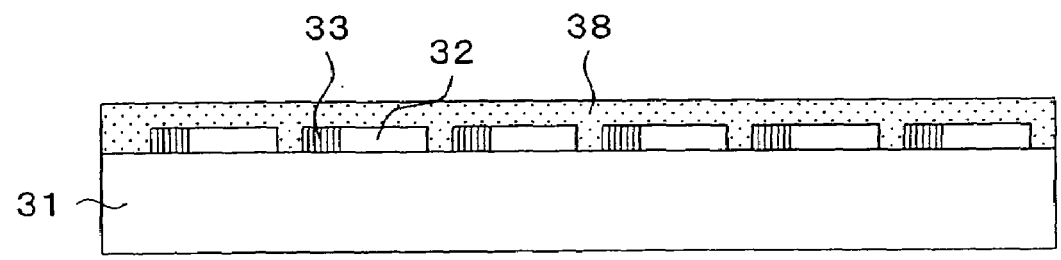

After that, as shown in FIG. 5C, a polymeric solid electrolytic layer 38 is formed on the transparent support structure 31. First, a synthetic resin as the matrix polymer of the polymeric solid electrolytic layer 38 and a material forming the electrolyte such as lithium salt, potassium salt, sodium salt, or tetra alkyl ammonium salt are mixed, and white particles are additionally dispersed as a coloring agent to prepare the material. This polymeric solid electrolytic material is coated to form the polymeric solid electrolytic layer 38.

Figure 6A:
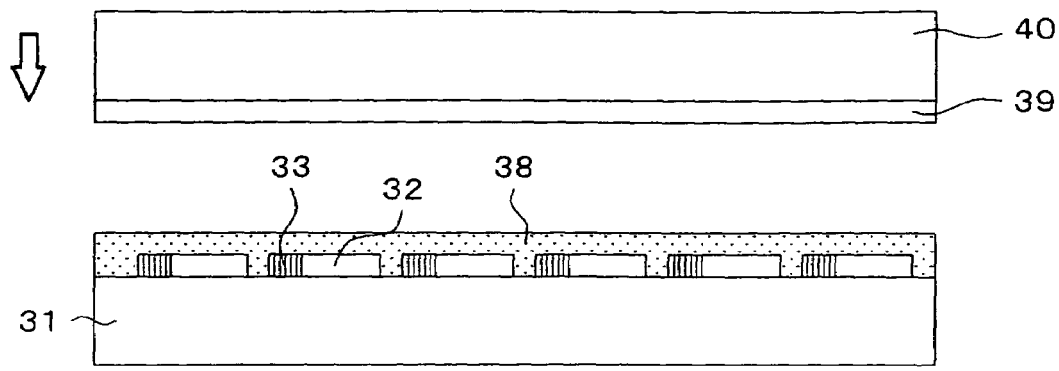
Figure 6B:
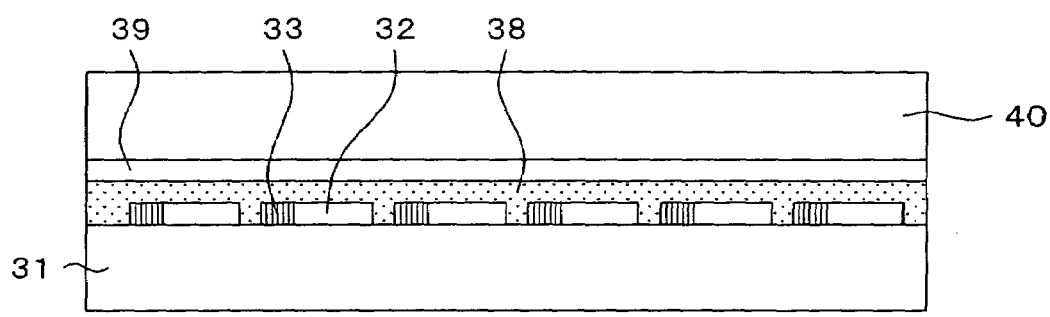
Figure 6C:
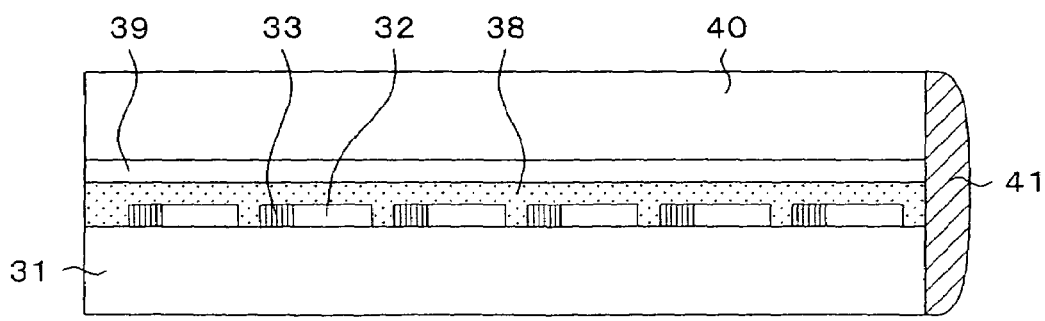

In parallel therewith, a common electrode 39 in form of a palladium film of an appropriate thickness is formed on the support structure 40 in form of a polyethylene terephthalate. The common electrode 39 on the support structure 40 is press-fit to the polymeric solid electrolytic layer 38 not yet cured as shown in FIG. 6A, and they are bonded together as shown in FIG. 6B. After the bonding, a polymeric solid electrolytic layer gelled by vacuum drying is formed between the support structure 40 and the transparent support structure 31. Then, as shown in FIG. 6C, a seal member 41 is attached to the end of the bonding to complete the electrochromic display apparatus.

In this embodiment, since the electrically active polymer layer is deposited by immersion into the electrodeposition liquid 36 in the electrodeposition vessel 35 and a supply of electricity, the polymer layer is formed on the transparent electrodes to be compounded therewith. Therefore, the polymer layer is prevented from falling or other undesirable events, and can be formed concentrically on the transparent pixel electrodes 32.

Fourth Embodiment

This embodiment is directed to another method of manufacturing the electrochromic display apparatus according to the first embodiment, which is a modification from the third embodiment. This embodiment will be explained below in order of its steps with reference to FIGS. 7A through 7C.

Figure 7A:
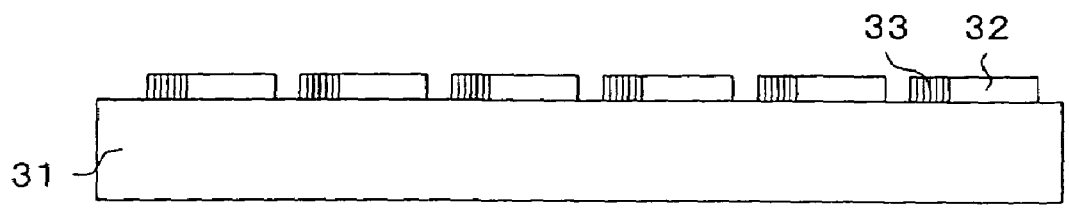

Similarly to the manufacturing method of the third embodiment, first referring to FIG. 7A, transparent pixel electrodes in form of an ITO film and thin-film transistors 33 are formed on a transparent support structure 31 such as a glass substrate for each pixel. The thin-film transistor 33 is formed by using a known semiconductor manufacturing technique, and the ITO film is formed by a technique such as vapor deposition or sputtering, for example. A transparent pixel electrode 32 and a thin-film transistor 33 are formed for each pixel, and a number of pixels are arranged in an matrix array on the transparent support structure 31. A lead portion (not shown) connectable to the drive circuit in a later step is also formed.

Figure 7B:
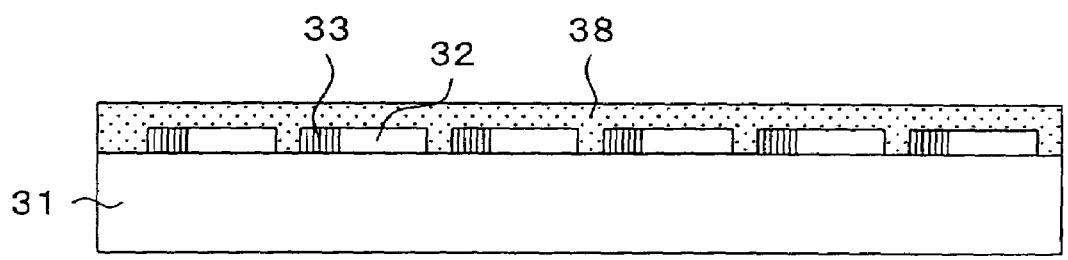

After that, as shown in FIG. 7B, a polymeric solid electrolytic layer 38 is formed on the transparent support structure 31. First, a synthetic resin as the matrix polymer of the polymeric solid electrolytic layer 38 and a material forming the electrolyte such as lithium salt, potassium salt, sodium salt, or tetra alkyl ammonium salt are mixed, and white particles are additionally dispersed as a coloring agent to prepare the material. This polymeric solid electrolytic material is coated to form the polymeric solid electrolytic layer 38. At this stage, the polymeric solid electrolytic layer 38 is dried and gelled.

Figure 7C:
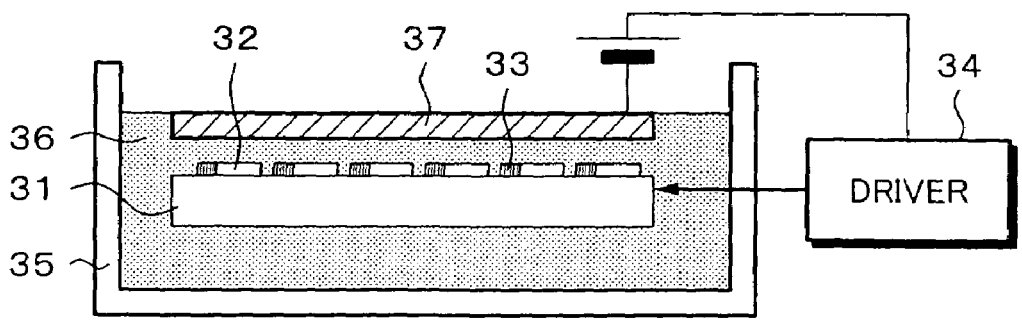

After the polymeric solid electrolytic layer 38 on the transparent support structure 31 is dried and gelled, the entirety is immersed into electrodeposition liquid 36 in an electrodeposition vessel 35 as shown in FIG. 7C. The electrodeposition liquid 36 functions to electrolytically deposit a polymer layer of polypyrole, for example. The drive circuit 34 supplies electricity to each transparent pixel electrode 32 to electrolytically deposit the polymer layer, not shown, of polypyrole, for example, on each transparent pixel electrode 32. In this process, the transparent pixel electrodes 32 face to an electrodeposition electrode 37 via the electrodeposition liquid 36. Immediately after the electrodeposition, the support structure as the second electrode and the surface with the common electrode are bonded, and through the steps shown in FIGS. 6A through 6C, the elctrochromic display apparatus is completed.

Fifth Embodiment

This embodiment is directed to a method of manufacturing the electrodeposition type display apparatus according to the second embodiment. The method will be explained below in the order of its steps with reference to FIGS. 8A through 8C, FIGS. 9A and 9B.

Figure 8A:
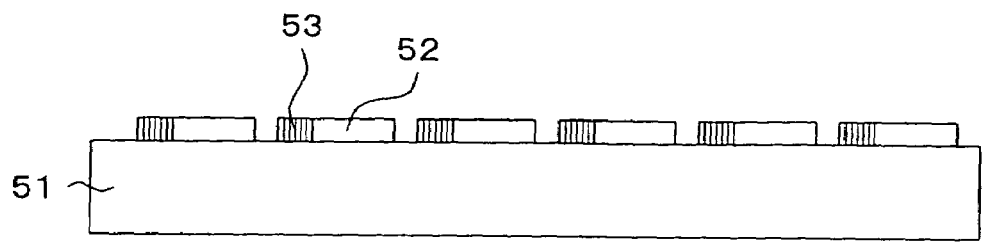

First referring to FIG. 8A, transparent pixel electrodes in form of an ITO film and thin-film transistors 53 are formed on a transparent support structure 51 such as a glass substrate for each pixel. The thin-film transistor 53 is formed by using a known semiconductor manufacturing technique, and the ITO film is formed by a technique such as vapor deposition or sputtering, for example. A transparent pixel electrode 52 and a thin-film transistor 53 are formed for each pixel, and a number of pixels are arranged in an matrix array on the transparent support structure 51.

Figure 8B:
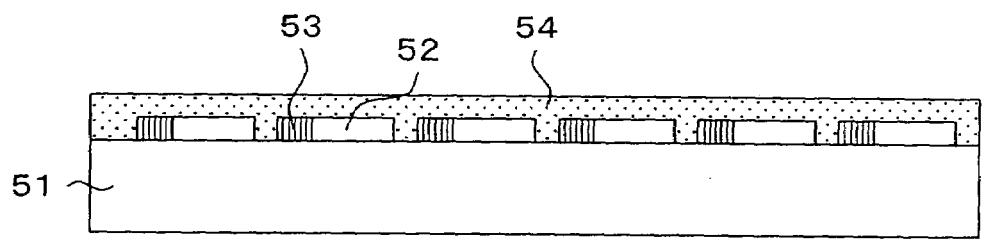

After the transparent pixel electrodes 52 and the thin-film transistors 53 are formed on the transparent support structure 51, a polymeric solid electrolytic layer 54 is formed on the transparent support structure 51 as shown in FIG. 8B. In the process of forming the polymeric solid electrolytic layer 54, a synthetic resin as the matrix polymer of the polymeric solid electrolytic layer 54, a material forming the electrolyte such as lithium salt, potassium salt, sodium salt, or tetra alkyl ammonium salt, and a metal ion generating agent such as bismuth chloride are mixed altogether, and white particles are additionally dispersed as a coloring agent to prepare the material. This polymeric solid electrolytic material is coated to form the polymeric solid electrolytic layer 54.

Figure 8C:
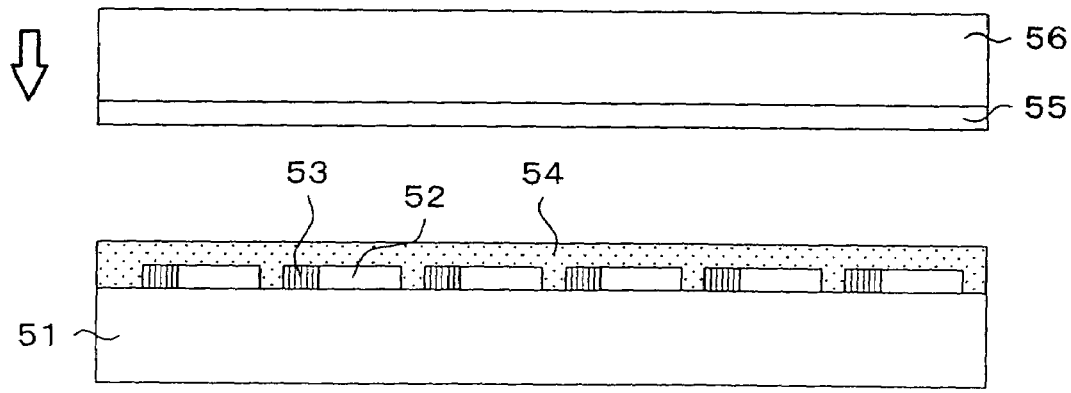
Figure 9A:
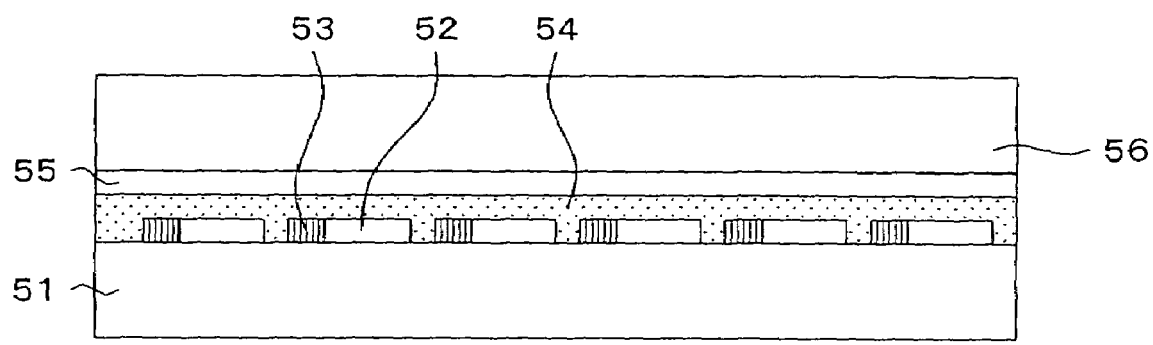
Figure 9B:
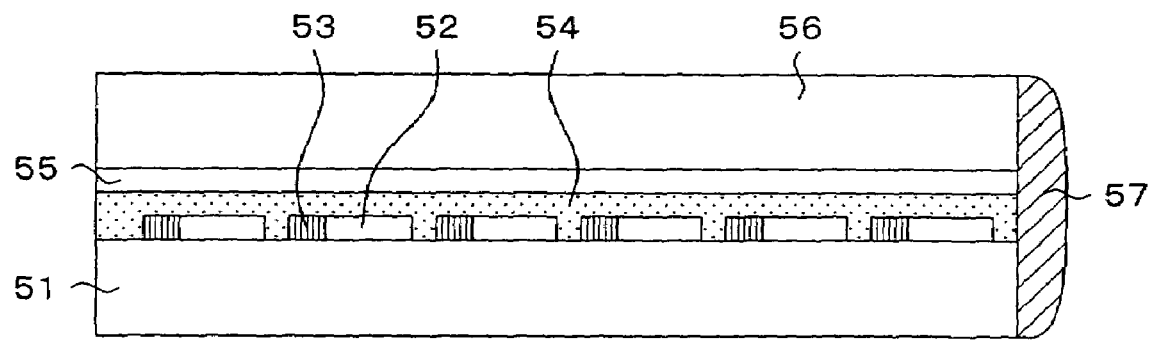

In parallel therewith, as shown in FIG. 8C, a common electrode 55 in form of a palladium film of an appropriate thickness is formed on the support structure 56 in form of a polyethylene terephthalate. The common electrode 55 on the support structure 56 is press-fit to the polymeric solid electrolytic layer 54 not yet cured, and they are bonded together as shown in FIG. 9A. After the bonding, a polymeric solid electrolytic layer gelled by vacuum drying is formed between the support structure 56 and the transparent support structure 51. Then, as shown in FIG. 9B, a seal member 57 is attached to the end of the bonding to complete the electrodeposition type display apparatus.

In this embodiment, metal ions are introduced together with the electrolyte at the step of preparation of the polymeric solid electrolytic layer 54. Therefore, the polymeric solid electrolytic layer 54 and the color-variable material are combined in a relatively easy process, and the manufacturing process is simplified accordingly.

Sixth Embodiment

The electrochromic display apparatus or electrodeposition type display apparatus according to the embodiment is an example in which potential detector electrodes 64, 65 are formed as third electrodes independently from the first transparent electrode and the second electrode (common electrode). These potential detector electrodes 64, 65 are placed as electrically insulated members on a common plane of the transparent support structure together with the transparent pixel electrodes or common electrode, and they are used for detecting the potential of the transparent pixel electrodes or common electrode on the transparent support structure.

Figure 10:
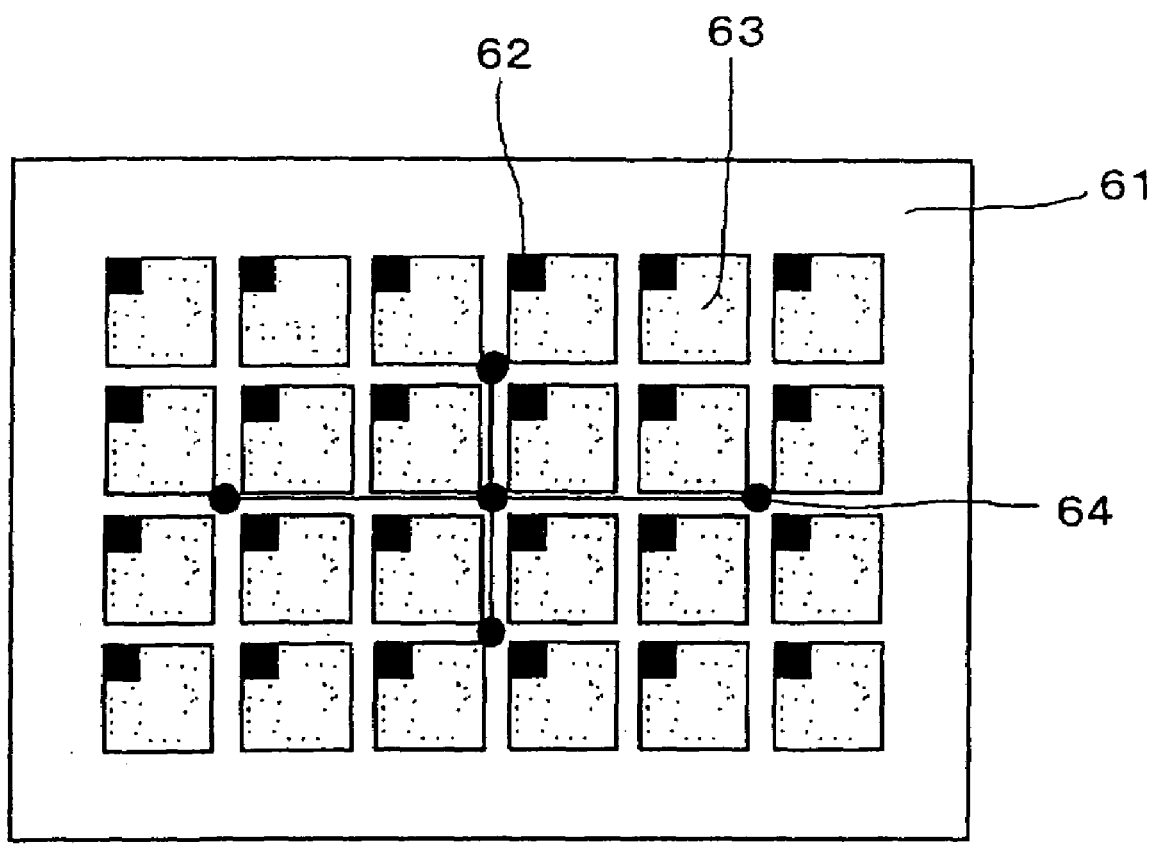
FIG. 10 is a plan view of the structure of one surface of an electrochromic display apparatus or electrodeposition type display apparatus according to the sixth embodiment of the invention on which transparent pixel electrodes appear.

FIG. 10 is a plan view of one surface on which the transparent pixel electrodes appear. On a transparent support structure 61, a transparent pixel electrode 63 and a TFT 62 as a drive device are formed for each pixel, and a number of pixels are arranged in a matrix array. The potential detector electrode 64 for detecting the potential of transparent pixel electrodes is formed in space among pixels to extend in a cross-like pattern, and its end portions (shown by black dots) are silver or aluminum electrodes having a thickness around 1000 nm. The line portions connecting the end portions are silver or aluminum linear wiring portions having a width around 1 μm. Since this potential detector electrode 64 is a electrically insulated member formed on a common plane together with the transparent pixel electrodes 63, it can precisely monitor the potential of the transparent pixel electrodes 63, and thereby precisely detect reaction occurring in the transparent pixel electrodes 63. As the material of the potential detector electrode 64, a stable metal material free from spontaneous elution into mediums absolutely irrelevant to reaction is preferably selected. For example, platinum, chromium, aluminum, cobalt, palladium or silver can be selected similarly to the second electrode.

Figure 11:
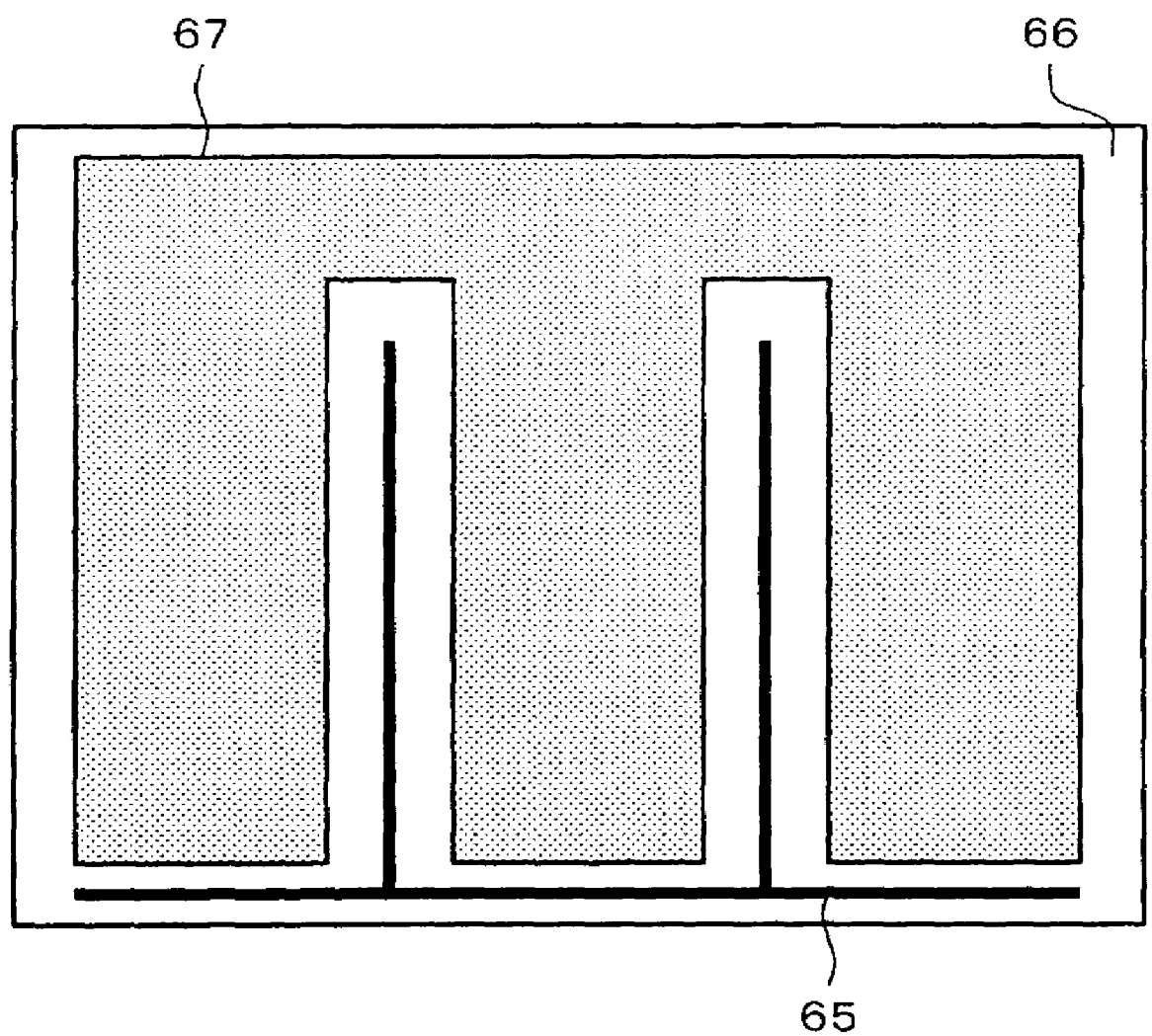
FIG. 11 is a plan view of the structure of one surface of the electrochromic display apparatus or electrodeposition type display apparatus according to the sixth embodiment of the invention, on which the common electrode appears.

FIG. 11 is a plan view of one surface on which the common electrode appears. A common electrode is formed on the support structure 66, and a potential detector electrode 65 is also formed in a pattern similar to the inverted π. Since this potential detector electrode 65 is a electrically insulated member formed on a common plane together with the common electrode 67, it can precisely monitor the potential of the common electrode 67, and thereby precisely detect reaction occurring in the common electrodes 67. As the material of the potential detector electrode 65, a stable metal material free from spontaneous elution into mediums absolutely irrelevant to reaction is preferably selected. For example, platinum, chromium, aluminum, cobalt, palladium or silver can be selected similarly to the second electrode. Since the potential detector electrode 65 can be made of the same material as that of the common electrode on the common plane, it can be easily formed by patterning the space between the potential detector electrode 65 and the common electrode 67.

Figure 12:
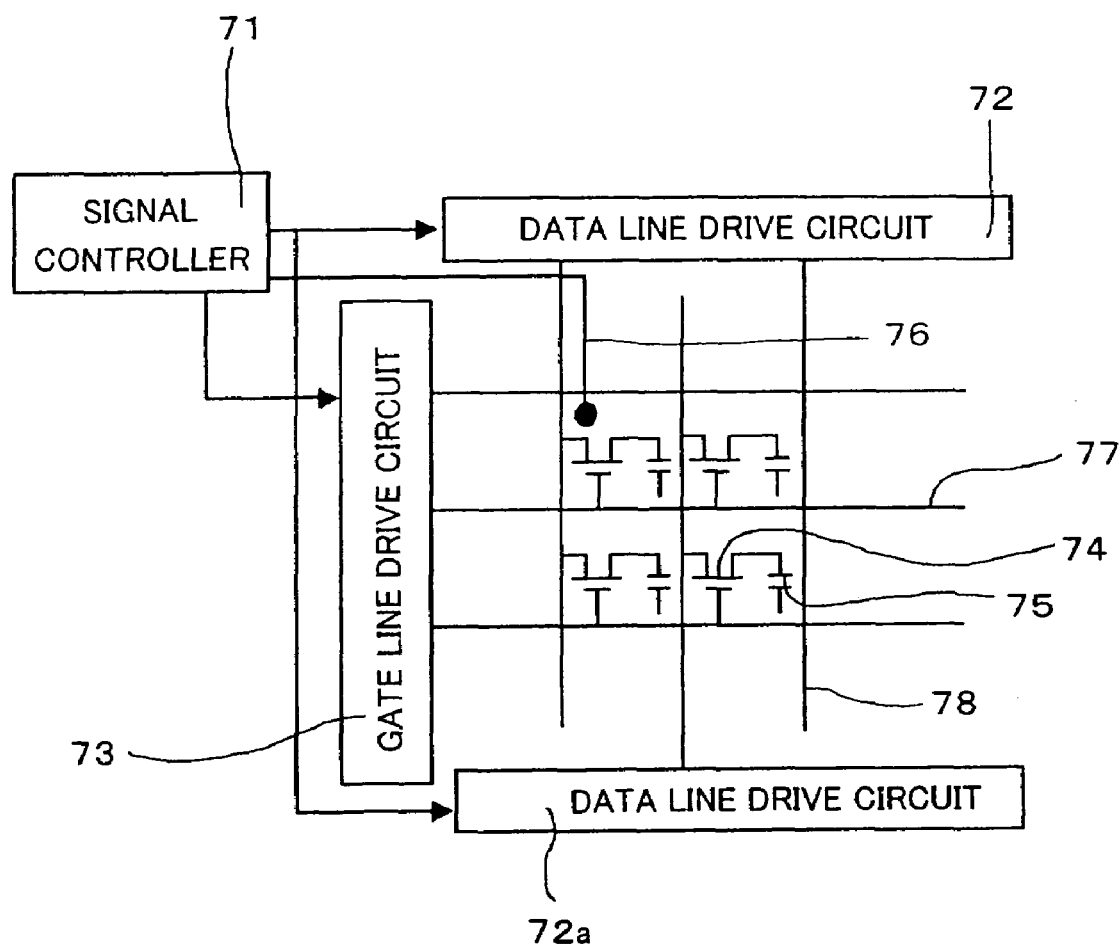
FIG. 12 is a circuit diagram of the electrochromic display apparatus or electrodeposition type display apparatus according to the sixth embodiment of the invention.

FIG. 12 is a circuit diagram of the electrochromic display apparatus or electrodeposition type display apparatus having a potential detector electrode 76. A number of pixels each composed of TFT 74 and a transparent pixel electrode 75 are arranged in a matrix array, and one of opposite electrodes of the capacitance serves as a common electrode. Data line drive circuits 72, 72a and a gate line drive circuit for selecting respective pixels are provided, and a predetermined data line 78 and a gate line 77 are selected by a signal from a signal controller 71. The potential detector electrode 76 is configured to connect from the signal controller 71, and the potential of the pixel portion can be monitored with the supply of a signal from the potential detector electrode 76. That is, a stable metal material free from spontaneous elution into mediums absolutely irrelevant to reaction is selected as the material of the potential detector electrode 76, and the electrode 76 can precisely monitor the progress of main reaction of electrochromic or metal precipitation dissolution. At the time when sufficient deposition or electrochemical reaction is confirmed through the monitor using the potential detector electrode 76, further reaction can be stopped.

Some examples will be explained together with their manufacturing methods. Although various effects of the invention are explained by way of these examples, the invention is not limited to them.

EXAMPLE 1

(Fabrication of Display Electrode)

A two-dimensional arrangement of ITO films and TFT (thin film transistor) aligned by 150 μm pitch were formed on a 1.5 mm thick glass substrate sized 10×10 cm. After a lead portion to be connected to the drive circuit from the substrate was formed by a known technique, and the entirety was next set in an electrodeposition vessel (see FIG. 5B). The electrodeposition liquid was prepared by solving 1M of tetraethyl ammonium tetrafluoroborate and 0.1M of pyrole in propylene carbonate. After that, 0.2 μA current was supplied to respective pixels from the drive circuit until the supplied electricity reached 20 μC. As a result, black polypyrole deposited on each ITO.

Subsequently, the glass substrate was set in the electrodeposition vessel containing the electrodeposition liquid obtained by solving 1M of tetraethyl ammonium tetrafluoroborate in propylene carbonate, voltage of each pixel electrode is adjusted to 1V relative to an $Ag^+/Ag$ reference electrode, and polypyrole having doped upon electrolytic polymerization was deionized. Polypyrole was changed to yellowish transparency. Subsequently, after the substrate was taken out and washed with ethanol, it was dried by vacuum drying.

(Adjustment and Coating of Polymeric Solid Electrolyte)

1 weight part of polyvinylidene fluoride of molecular weight 350,000 approximately was mixed in 10 weight part of 1:1 mixture solvent of propylene carbonate and ethylene carbonate containing 1.7 weight part of boron tetrabuthyl ammonium fluoride, and the mixture was heated to 120° C. to prepare a homogenous solution. Subsequently, 0.2 weight part of titanium dioxide having the mean grain size 0.5 μm was added to the solution, and uniformly dispersed by homogenizer. This was next coated on the glass substrate with a doctor blade up to the thickness 60 μm, then the common electrode as the second electrode, explained later, was immediately bonded, and dries by vacuum drying under 110° C. and 0.1 Mpa for one hour. Thus the gelled polymeric solid electrolyte was formed between two electrodes. The end surfaces with the bonding seam were sealed with an adhesive.

(Second Electrode (Counter Electrode, Common Electrode))

A 3000 Å palladium film was formed on a 0.5 mm thick polyethylene terephthalate film sized 10×10 cm by sputtering. It was press-fit immediately after being coated with the polymeric solid electrolyte.

(Drive and Estimation of Display Characteristics)

Using a known active matrix drive circuit, display electrodes were oxidized with 5 μC electricity per pixel upon coloring, and reduced with the same quantity of electricity upon decoloring to switch the black display and colorless (white) display. Reflectance of colorless display was 70%, and optical density (OD) of the display portion upon coloring (black) was approximately 1.3 (reflectance 5%). Therefore, reflectance contrast of 1:12 was obtained. After the sample was maintained in the coloring state, the circuit was opened, and the sample was left. After one week, optical density of the display portion was approximately 1.0, and the sample was confirmed to have a memory capability. The cycle of coloring and decoloring was repeated, and the number of repetition cycles until the black concentration upon coloring degrades to 1.0 or lower was approximately eight million times.

EXAMPLE 2

Polymeric solid electrolyte was coated on a TFT substrate beforehand and dried and gelled similarly to Example 1. Thereafter, the substrate was introduced into the electrodeposition vessel, and electricity was supplied similarly to Example 1. As a result, polypyrole deposited on ITO electrodes in a compounded form with the matrix polymer of polymeric solid electrolyte. The substrate was removed from the electrodeposition vessel and immediately bonded to the counter electrode (second electrode), and the sample was dried under the same condition.

When the sample was driven and evaluated similarly to Example 1, the repetition number of cycles was approximately thirty million times, and the other characteristics were equivalent.

EXAMPLE 3

(Fabrication of Display Electrodes, and Preparation and Coating of Polymeric Solid Electrolyte)

A two-dimensional arrangement of ITO films and TFT (thin film transistor) aligned by 150 μm pitch were formed on a 1.5 mm thick glass substrate sized 10×10 cm. Thereafter, 1 weight part of polyvinylidene fluoride of molecular weight 350,000 approximately was mixed in 10 weight part of 1:1 mixture solvent of water and isopropyl alcohol containing 1.7 weight part of lithium bromide and 1.7 weight part of bismuth chloride, and the mixture was heated to 120° C. to prepare a homogenous solution. Subsequently, 0.2 weight part of titanium dioxide having the mean grain size 0.5 μm was added to the solution, and uniformly dispersed by homogenizer. This was next coated on the glass substrate with a doctor blade up to the thickness 60 μm, then the common electrode as the second electrode, explained later, was immediately bonded, and dries by vacuum drying under 110° C. and 0.1 Mpa for one hour. Thus the gelled polymeric solid electrolyte was formed between two electrodes. The end surfaces with the bonding seam were sealed with an adhesive.

(Second Electrode (Counter Electrode, Common Electrode))

A 3000 Å palladium film was formed on a 0.5 mm thick polyethylene terephthalate film sized 10×10 cm by sputtering. It was press-fit immediately after being coated with the polymeric solid electrolyte.

(Drive and Estimation of Display Characteristics)

Using a known active matrix drive circuit, display electrodes were oxidized with 5 μC electricity per pixel upon coloring, and reduced with the same quantity of electricity upon decoloring to switch the black display and colorless (white) display. Reflectance of colorless display was 70%, and optical density (OD) of the display portion upon coloring (black) was approximately 0.8 (reflectance 13%). Therefore, reflectance contrast of 1:5 was obtained. After the sample was maintained in the coloring state, the circuit was opened, and the sample was left. After one week, no substantial change in optical density of the display was observed, and the sample was confirmed to have a memory capability. The cycle of coloring and decoloring was repeated, and the number of repetition cycles until the black concentration upon coloring degrades to 1.0 or lower was approximately eighty million times.

EXAMPLE 4

A sample was prepared using the same conditions that of Example 3, excepting the use of a mixture of polyvinylidene chloride fluoride, $LiBF_4$ and $AgClO_4$. When the sample was driven and evaluated similarly to Example 3, the repetition number of cycles was approximately thirty million times, and the other characteristics were equivalent.

EXAMPLE 5

Figure 13:
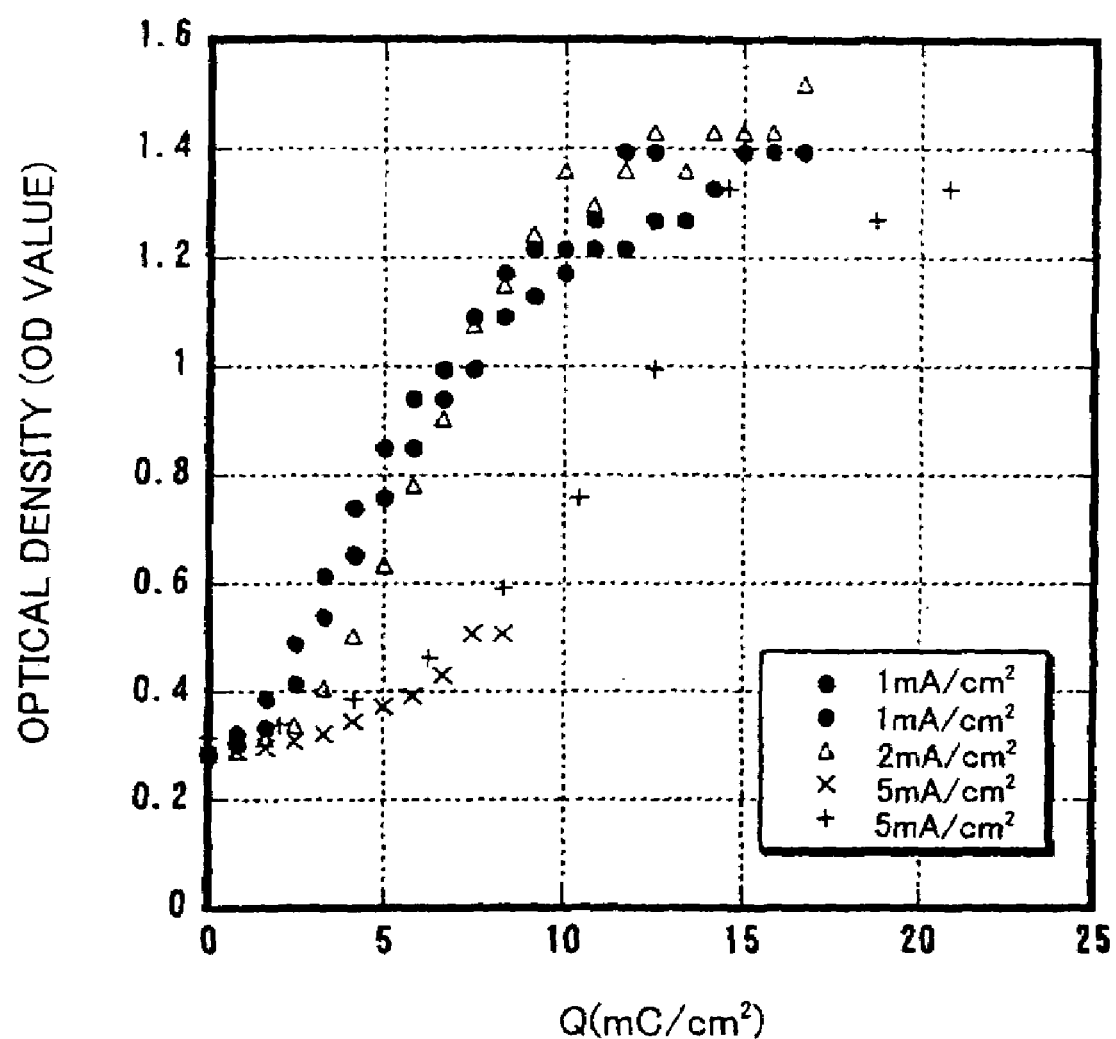
FIG. 13 is a graph of a result of measurement, which shows a relation between current density and optical density (color density) in an electrodeposition type display apparatus according to the invention.

Measurement was carried out in regard to relations between the quantity of electricity supplied to pixel electrodes in an electrodeposition type display apparatus and coloring concentration (optical density) of the pixels by deposited silver. Results of the measurement are shown in FIG. 13. To obtain well visible characters, in general, concentration of the character portion should be at least 1.0 in optical density (OD), and preferably at least 1.5. Therefore, it is appreciated from the results shown in FIG. 13 that the quantity of electricity required is approximately not less than 5 $mC/cm^2$, and preferably not less than 10 $mC/cm^2$. Quantity of electricity below that range will produce pale characters difficult to read. Optical density beyond 1.5 will provide sufficient visibility. However, even if it is raised than that value, visibility is not improved so much because of saturation for the human sense. Additionally, when optical density is raised beyond 1.5, since a large quantity of metal such as silver deposits, opposite reaction (decoloring reaction) will become insufficient, and incomplete extinguishment will occur. Therefore, quantity of electricity supplied is preferably adjusted to or below 20 mC/cm$^2$.

According to the above-explained structure, the electrochromic display device and apparatus according to the invention are capable of matrix driving by using drive devices formed in respective pixels, and can enhance the contrast and the black concentration by the use of a polymer material in contact with the polymeric solid electrolyte to color electrochemical oxidation and reduction.

The electrodeposition type display device and apparatus can remove the problem of bronzing and keep the black concentration high even after long-use because of the use of polymeric solid electrolyte containing metal ions.

The manufacturing method of an electrochromic display apparatus or an electrodeposition type display apparatus according to the invention can easily manufacture the electrochromic display apparatus or electrodeposition type display apparatus having the above-explained structure.

The invention claimed is:

1. An electrochromic display device comprising: a first transparent electrode controlled by a drive device; a polymer material layer located in contact with said transparent electrode and electrically active to be changeable in color by electrochemical oxidation or reduction; a polymeric solid electrolytic layer located in contact with said polymer material layer and containing a coloring agent; and a second electrode located to interpose said polymer material layer and said polymeric solid electrolytic layer between said first transparent electrode and said second electrode,
    wherein the polymer material forming said polymer material layer is polyazulene, and
    wherein said polymeric solid electrolytic layer is a lamination of a plurality of layers, and said coloring agent is contained only in one or some of said layers.

2. The electrochromic display device according to claim 1 wherein the polymer material forming said polymer material layer is a polymer obtained by electric oxidizing polymerization of azulene, or its derivatives.

3. The electrochromic display device according to claim 1 wherein the polymeric solid electrolyte forming said polymeric solid electrolytic layer is polyethylene oxide, polypropylene oxide, polyethylene imine or polystyrene sulfide whose framework structure unit is expressed by —(C—C—O)$_n$—, —(C—C(CH$_3$))$_n$—, —(C—C—N)$_n$— or —(C—C—S)$_n$—, or a polymer material including any of those materials as the main chain structure thereof and having branches, or polymethylmethacrylate, polyvinylidene fluoride, polyvinylidene chloride, polycarbonate, or a mixture or lamination thereof mixed with metallic salt, or alkyl ammonium salt.

4. The electrochromic display device according to claim 1 wherein a plasticizer selected from water, ethyl alcohol, isopropyl alcohol, propylene carbonate, dimethyl carbonate, ethylene carbonate, γ-butylolactone, acetonitrile, sulfolane, dimethoxyethane, dimethylformamide, dimethylsulfoxide, or mixtures thereof, is added to said polymeric solid electrolytic layer.

5. The electrochromic display device according to claim 1 wherein said coloring agent is an inorganic pigment, an organic pigment or a coloring matter.

6. The electrochromic display device according to claim 5 wherein said inorganic pigment is powder of titanium dioxide, calcium carbonate, magnesium oxide or aluminum oxide.

7. The electrochromic display device according to claim 1 wherein said first transparent electrode contains SnO$_2$, In$_2$O$_3$ or their mixture as a major component thereof.

8. The electrochromic display device according to claim 1 wherein said second electrode is a metal thin film.

9. The electrochromic display device according to claim 1 further comprising a third electrode independent from said first transparent electrode and said second electrode.

10. The electrochromic display device according to claim 9 wherein said third electrode is located as an electrically insulated element on a common plane together with said first transparent electrode and said second electrode.

* * * * *